US005505915A

United States Patent [19]

Copeland et al.

[11] Patent Number: 5,505,915

[45] Date of Patent: *Apr. 9, 1996

[54] SOLID CHEMICAL DISPENSER WITH MOVABLE NOZZLE

[75] Inventors: James L. Copeland, Burnsville; John E. Thomas, River Falls; Daniel K. Boche; Daniel F. Brady, both of Eagan, all of Minn.

[73] Assignee: Ecolab Inc., St. Paul, Minn.

[ * ] Notice: The portion of the term of this patent shall not extend beyond the expiration date of Pat. No. 5,389,344.

[21] Appl. No.: 389,129

[22] Filed: Feb. 14, 1995

Related U.S. Application Data

[63] Continuation-in-part of Ser. No. 169,325, Dec. 17, 1993, Pat. No. 5,411,716, which is a continuation-in-part of Ser. No. 131,653, Oct. 5, 1993, Pat. No. 5,389,344.

[51] Int. Cl.[6] .............................. B01D 11/02; B08B 3/08

[52] U.S. Cl. ........................... 422/264; 422/263; 134/93; 68/17 R

[58] Field of Search .................................... 422/264, 263; 222/189; 137/268; 239/222.11, 310, 379; 134/7, 172, 198, 93; 68/17 R

[56] References Cited

U.S. PATENT DOCUMENTS

| | | | |
|---|---|---|---|
| 2,371,720 | 3/1945 | Stine | 299/83 |
| 2,382,163 | 8/1945 | MacMahon | 252/138 |
| 2,382,164 | 8/1945 | MacMahon | 252/138 |
| 2,382,165 | 8/1945 | MacMahon | 252/135 |
| 2,412,819 | 12/1946 | MacMahon | 252/138 |
| 2,686,080 | 8/1954 | Wood | 299/83 |
| 3,089,508 | 5/1963 | Schulze et al. | 127/433 |
| 3,595,438 | 7/1971 | Daley et al. | 222/67 |
| 3,870,471 | 3/1975 | Tepas, Jr. et al. | 23/267 E |
| 3,911,862 | 10/1975 | Lupkas | 118/680 |
| 3,939,527 | 2/1976 | Jones | 15/353 |
| 3,974,541 | 8/1976 | Silvis et al. | 15/320 |
| 4,020,865 | 5/1977 | Moffat et al. | 137/268 |
| 4,063,663 | 12/1977 | Larson et al. | 222/52 |
| 4,111,011 | 9/1978 | Waugh | 68/17 R |
| 4,295,244 | 10/1981 | Herpers et al. | 15/320 |
| 4,348,783 | 9/1982 | Swanson et al. | 15/320 |
| 4,377,017 | 3/1983 | Herpers et al. | 15/320 |
| 4,393,538 | 7/1983 | Olson | 15/320 |
| 4,420,394 | 12/1983 | Lewis | 210/169 |
| 4,426,362 | 1/1984 | Copeland et al. | 422/263 |
| 4,462,511 | 7/1984 | Fulmer et al. | 222/52 |
| 4,464,810 | 8/1984 | Karpanty | 15/320 |
| 4,536,314 | 8/1985 | Hardy et al. | 252/102 |
| 4,536,635 | 8/1985 | Shook | 219/83 |
| 4,566,149 | 1/1986 | Fitzwater | 15/320 |
| 4,569,780 | 2/1986 | Fernholz et al. | 252/90 |
| 4,569,781 | 2/1986 | Fernholz et al. | 252/92 |
| 4,571,327 | 2/1986 | Larson et al. | 422/263 |

(List continued on next page.)

OTHER PUBLICATIONS

Wrangler Brochure, entitled "Wrangler F/B 27"–33" Automatic Scrubbers", published by The National Super Service Company, copyright 1992.

Tornado Brochure, entitled "Tornado Long–Range Automatic Floorkeepers," published by Breuer Electric Mfg. Co., copyright 1992.

Clarke Brochure, entitled "Clarke Family of Compact Automatics", published by Clarke Industries Inc., undated. Prior Art.

*Primary Examiner*—Robert J. Warden
*Assistant Examiner*—E. Leigh Dawson
*Attorney, Agent, or Firm*—Merchant, Gould, Smith, Edell, Welter & Schmidt

[57] ABSTRACT

Disclosed is a dispenser 10 for a solid chemical 13 and a method of dispensing the chemical 13. Water enters via an inlet line 22 and is sprayed from a spray nozzle 21, so that the solid chemical 13 is dispensed in the form of an aqueous chemical solution via outlet line 17. The solution's concentration is adjustable by varying the distance between the spray nozzle 21 and the exposed dissolving surface of the chemical 13. The spray nozzle's position is adjusted by means of a screw jack 68, a push-pull cable 93, a solenoid 100, or a lever 117.

28 Claims, 9 Drawing Sheets

U.S. PATENT DOCUMENTS

| | | | |
|---|---|---|---|
| 4,586,208 | 5/1986 | Trevarthen | 8/158 |
| 4,635,666 | 1/1987 | Daley et al. | 134/172 |
| 4,667,364 | 5/1987 | Meili | 15/320 |
| 4,675,935 | 6/1987 | Kasper et al. | 15/319 |
| 4,687,121 | 8/1987 | Copeland | 222/64 |
| 4,690,305 | 9/1987 | Copeland | 222/52 |
| 4,709,442 | 12/1987 | Sletten, II | 15/320 |
| 4,759,094 | 7/1988 | Palmer et al. | 15/320 |
| 4,803,753 | 2/1989 | Palmer | 45/320 |
| 4,826,661 | 5/1989 | Copeland et al. | 422/106 |
| 4,836,229 | 6/1989 | Lakhan et al. | 134/93 |
| 4,858,449 | 8/1989 | Lehn | 68/12 R |
| 4,861,518 | 8/1989 | Morganson et al. | 252/548 |
| 4,867,193 | 9/1989 | Hayashi et al. | 139/93 |
| 4,893,375 | 1/1990 | Girman et al. | 15/321 |
| 4,956,891 | 9/1990 | Wulff | 15/320 |
| 5,088,149 | 2/1992 | Berg et al. | 15/322 |
| 5,199,228 | 4/1993 | Beausoleil | 51/417 |
| 5,389,344 | 2/1995 | Copeland et al. | 422/264 |

SOLID CHEMICAL DISPENSER WITH MOVABLE NOZZLE

This is a continuation-in-part application of Ser. No. 169,325, filed Dec. 17, 1993, now U.S. Pat. No. 5,411,716, issued May 2, 1995, which is a continuation-in-part application of Ser. No. 131,653, filed Oct. 5, 1993, now U.S. Pat. No. 5,389,344, issued Feb. 14, 1995.

FIELD OF THE INVENTION

The invention relates broadly to the dispensing of water-soluble compositions used in cleaning processes. More specifically, the invention relates to the dispensing of a concentrated cleaning solution from a solid cleaning composition. The concentrated cleaning solution is created by contacting the solid cleaning composition with a dissolving liquid. Cleaning compositions include compounds such as detergents, rinse aids, and the like employed in cleaning fabrics, dishes and hard surfaces.

BACKGROUND OF THE INVENTION

A number of different techniques have been developed and used for converting solid chemicals used in cleaning processes into a concentrated solution. For example, devices designed for a powdered, flaked or granular detergent are disclosed in Daley et al, U.S. Pat. No. 3,595,438, issued Jul. 27, 1991; Moffet et al, U.S. Pat. No. 4,020,865, issued May 3, 1977; and Larson et al, U.S. Pat. No. 4,063,663, issued Dec. 20, 1977. Another form of solid detergent is the pre-shaped detergent briquette. Dispensing systems for dissolving detergent briquettes are known in the art. See, for example, U.S. Pat. Nos. 2,382,163; 2,382,164; and 2,382,165 all issued Aug. 14, 1945 to MacMahon; and U.S. Pat. No. 2,412,819, issued Dec. 17, 1946 to MacMahon.

A more recent form of solid detergent is the "cast" or block form. The detergent block may comprise a detergent cast within a mold or container or a detergent block which is free-standing. Dispensing systems for these solids are known in the art. See, for example, U.S. Pat. No. 4,426,362, issued to Copeland et al and commonly owned U.S. Pat. Nos. 4,569,781 and 4,569,780, issued Feb. 11, 1986, to Fernholz et al. The cast detergent is dispensed by spraying a solvent onto the detergent block within the container, thereby dissolving the exposed surface of the detergent to form a concentrated working solution. The concentrated working solution falls into a reservoir or is directed by a conduit to the wash tank of a washing apparatus. When the chemical compound within the container is completely utilized, the exhausted container may be simply discarded and a fully charged container may be placed in the dispenser.

Solid, cast chemicals used in cleaning processes are preferably cast in a sturdy container which can act as a mold, a shipping and storage container, and a dispenser housing. The cast chemical may be dispensed by inverting the container over a spray nozzle and impinging solvent directly onto the exposed surface or surfaces of the chemical contained therein. The container may either be retained within the dispenser as the chemical is being used, or the chemical may be removed from the container and placed into the dispenser. However, hazardous chemicals used in cleaning processes such as highly alkaline detergents are preferably packaged such that they can be dispensed without coming into physical contact with the human body.

Known dispensing devices have sought to maintain a relatively constant rate of the chemical being dispensed, or a constant concentration, by maintaining a fixed distance between the dissolving spray nozzle and the exposed and erodible surface of the solid block of chemical. See, for example, commonly owned U.S. Pat. No. 4,687,121, issued to Copeland on Aug. 18, 1987; U.S. Pat. No. 4,690,305, issued to Copeland on Sep. 1, 1987, and U.S. Pat. No. 4,826,661, issued to Copeland et al May 2, 1988. Alternatively, a separate control system has regulated the amount of detergent dispensed and has maintained a constant concentration, thereby making it unnecessary to control the nozzle-to-eroding surface distance.

In many situations, however, it is desirable for the chemical concentration to be variable. The optimum chemical concentration depends upon such factors as the type of solid chemical being dispensed, the type of surface being cleaned, the amount of soil being removed from the fabric or surface being cleaned, the temperature of the solvent, the degree of mechanical action applied to the fabric or surface being cleaned, and the volume of cleaning solution being produced.

In the past, adjusting the concentration of the cleaning solution has typically been done manually by the operator. That is, a certain amount of cleaning solution has been dispensed from the solid chemical, to which a certain amount of water is added. If a higher use solution concentration is desired, then less water is added to the concentrated cleaning solution. However, this procedure does not result in a consistent, precise, and controlled solution concentration, and often results in the use solution having either too much or too little cleaning chemical concentration.

Accordingly, a need exists for a dispensing apparatus which can simply, safely, efficiently and inexpensively dispense a concentrated chemical solution from a solid block of wash chemical at predictably variable and adjustable concentrations.

SUMMARY OF THE INVENTION

It has been discovered that the rate of detergent dispensed can be varied by adjustment of the distance between the nozzle and the detergent product. The dispenser has a spray nozzle for directing a solvent, preferably water, upon the exposed and eroding surface of a solid chemical. Adjustment means varies the distance between the spray nozzle and the eroding surface. In the preferred embodiment, the solid block chemical is supported in a stationary position, and an adjustment assembly varies the vertical position of the nozzle with respect to the solid chemical.

Another aspect of the present invention is a method for dispensing a solid chemical, comprising the steps of: directing a solvent through an inlet line and a spray nozzle; adjusting the position of the spray nozzle so as to adjust the distance between the spray nozzle and the solid chemical's eroding surface, thereby adjusting the concentration of chemical dispensed; and impinging the solvent from the spray nozzle onto the eroding surface of the solid chemical.

The present invention is configured to vary the distance between the spray nozzle and the exposed and erodible surface of the solid block of chemical. This feature allows the user to vary the rate of chemical dispensed, based upon the type of chemical and the particular application. For a cleaning application, the optimum dispensing rate will be determined by the type of detergent, the type and amount of soil being removed, the type of fabric or hard surface being cleaned, the temperature of the solvent, and other factors. In this manner, the amount of cleaning chemical dispensed can more accurately meet the particular requirements of the situation and allow for improved quality and efficiency. The invention prevents under use of the cleaning chemical and thereby provides sufficient cleaning product for the task, while at the same time preventing over-use of the cleaning product, which can result in undesirable residue and waste.

Another advantage of the present invention is that the solution concentration is readily adjustable. In some embodiments of the adjustment means, the concentration of cleaning chemical can be quickly changed by the user manually through a series of mechanical linkages. In other embodiments of the adjustment means, the concentration can be automatically controlled by suitable electronic means, such as a servo system.

Yet another advantage of the present invention is that it allows for use of a solid block detergent, with its accompanying benefits of minimizing the possibility of skin contact with the wash chemical, allowing the solid wash chemical to be formed and packaged in the single step, and having predictable dissolving characteristics. A solid detergent also permits the combination of non-compatible ingredients, such as a silicon defoamer and a surfactant, which could not be effectively combined as liquids.

As used herein, the term "utilization point," when used in combination with concentrated chemical solution, refers to the point where the solution is used or stored, i.e., a wash tank, a reservoir, a spray nozzle, etc.

As used herein, the term "cleaning composition" refers to those compounds or mixtures commonly added to aqueous liquids to aid in the cleaning and rinsing of fabrics, wares, and hard surfaces. Such chemicals include detergents, softeners, bleaches, rinse aids, etc.

DETAILED DESCRIPTION OF THE PREFERRED EMBODIMENT

The inventive dispenser of the present invention will be described with respect to its use on a floor scrubber machine 75. However, it is to be understood that the inventive dispenser could be used in many other applications, such as for laundry chemicals, dishwashing chemicals, and any other solid chemical composition which is dissolvable by a solvent before use.

Figure 1:
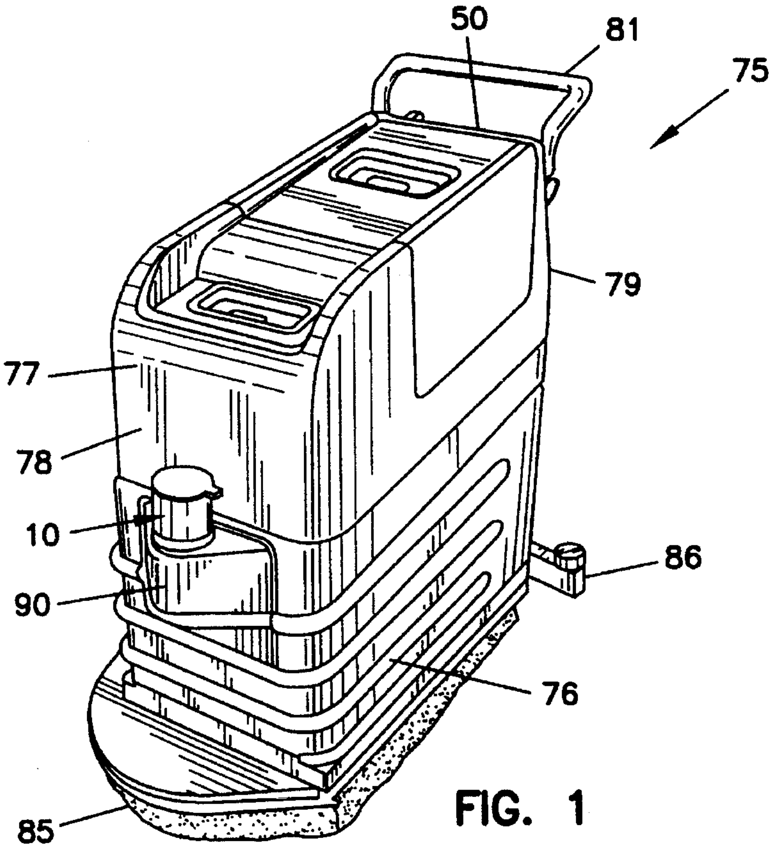
FIG. 1 is a perspective view of a floor scrubber machine which utilizes the dispenser of the present invention.
Figure 2:
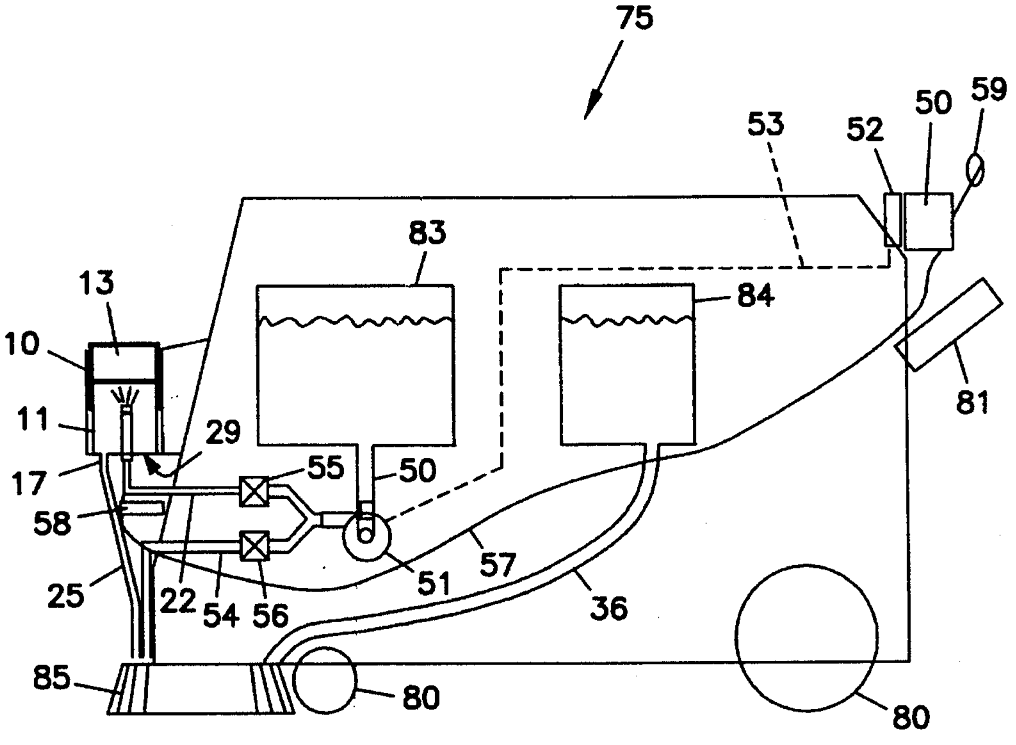
FIG. 2 is a schematic view of the floor scrubber machine illustrated in FIG. 1.

Referring to FIGS. 1 and 2, the floor cleaning machine 75 includes a support structure 76 having metal framework components, and a housing 77 which is made of a molded polymeric material. The machine 75 has a front end 78 and a rear end 79. Beneath the support structure are wheels 80. At the rear of the machine 75 is a handle 81 for manually grasping and pushing the cleaning machine 75.

The operator is able to control the linear velocity of the floor scrubber 75. With some types of floor scrubbers, the operator has a choice of three or four linear velocities, and with other floor scrubbers, the linear velocity is continuously variable. The speed control knob (not shown) is located on a control panel 50 proximate the handle 81.

Near the front 78 of the machine 75 are one or more rotating scrubbing brushes 85, which may be of many different sizes and configurations. The power-operated scrub brush 85 is operated by a drive belt (not shown) or the equivalent.

Near the rear of the machine 75, i.e., behind the scrub brush 85, are a plurality of vacuum pickup inlet nozzles (not shown) which pick up the spent detergent solution from the floor. The spent solution is drawn into a conduit 36 and into a dirty solution tank 84. The vacuum pick-up nozzles are attached to a rubber pick-up blade 86 which directs the detergent solution to the vacuum conduit 36.

The dispenser of the present invention and its associated components will now be described. The dispenser 10 is preferably mounted to the front wall 78 of the floor scrubber 75, as illustrated in FIGS. 1 and 2. However, it is to be understood that the dispenser 10 could be mounted within the interior of the floor scrubber machine 75 or in any other suitable location. In the preferred embodiment, a molded plastic shroud 90 surrounds and encloses the bottom portion of the dispenser 10. The upper portion of the dispenser 10 is not covered by the shroud, and it is accessible to the operator for adding detergent. The dispenser 10 is mounted to the shroud 90 with suitable fasteners, such as screws, and the shroud 90 is mounted to the front wall of the machine 75 with suitable fasteners, such as screws.

With conventional floor scrubbing machines, a detergent solution would be contained within the tank 83. With the present invention, the floor scrubber's detergent solution tank 83 is used instead for containing water. Alternatively, the tank 83 may be filled with a chemical additive which acts as a solvent and reacts favorably with the solid detergent.

The water reservoir 83 has a water conduit 50, which extends to an electrical water pump 51. The speed of the pump 51 is adjustable by a controller 52 which is connected to the pump by circuitry 53. For example, the pump is of the diaphragm type in the preferred embodiment. Downstream from the water pump 51, the water conduit splits into two lines: a water rinse line 54 and a water inlet line 22 for the dispenser 10. Each of these water lines 54, 22 has a directional control valve 55, 56. The valves 55, 56 are alternately open depending upon adjustment by the operator. When the valve 55 is open and the valve 56 is closed, water is supplied to the dispenser 10 in order to create a detergent solution. When the valve 56 is open and the valve 55 is closed, rinse water is supplied to the floor.

The dispenser 10 has a nozzle adjustment means 58 for varying the position of the nozzle 21 and thereby adjusting the detergent concentration. A line 57 interconnects the adjustment means 58 to the nozzle position control mechanism 59 on the control panel 50. Preferably the nozzle position control 59 is operated by moving a lever. The line 57 may be either an electrical connection or a mechanical connection such as a push-pull cable, as will be described below.

Figure 3:
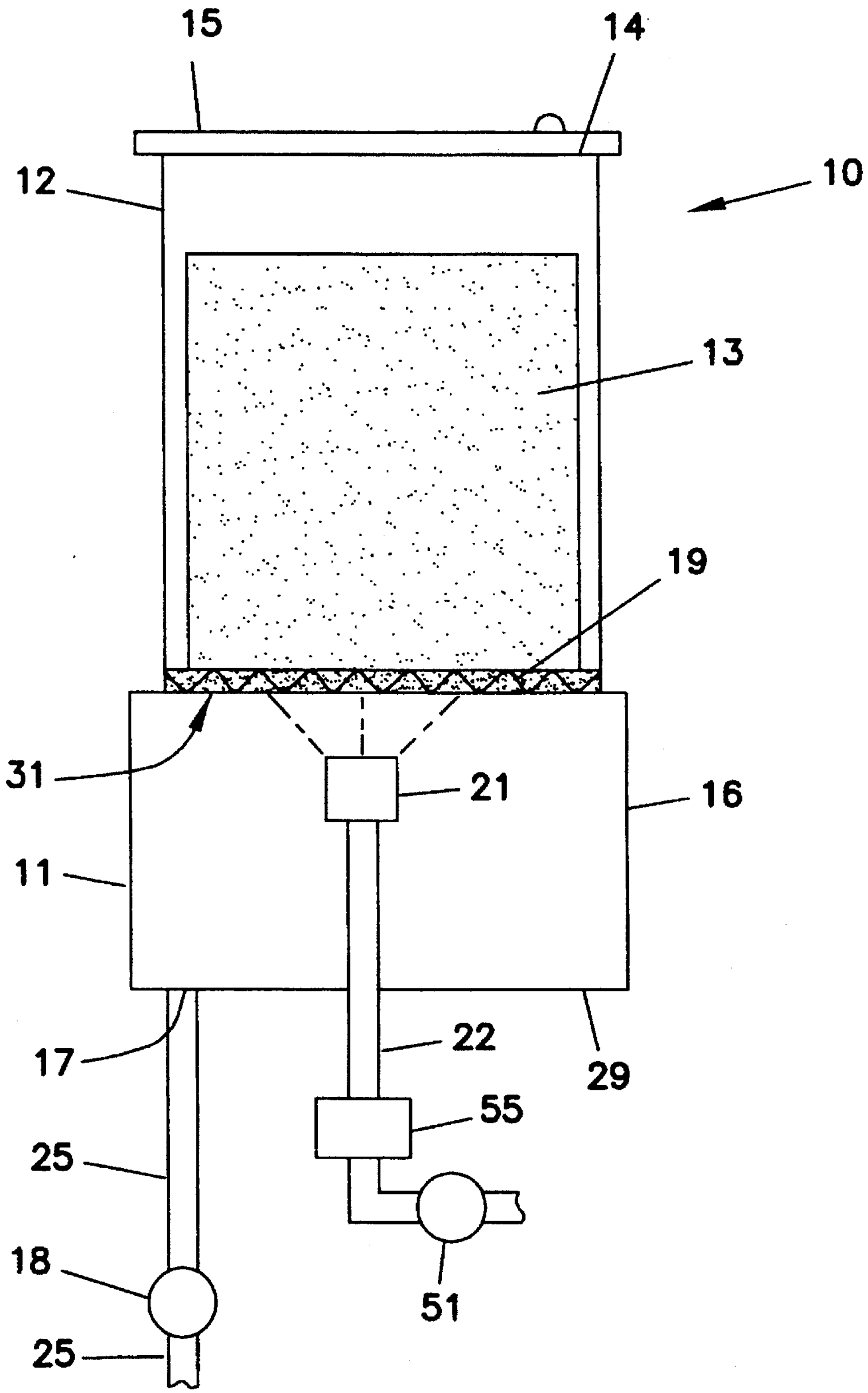
FIG. 3 is a side-elevational, schematic view of the dispenser of the present invention.

FIG. 3 illustrates the dispenser 10 of the present invention. The dispenser 10 has a housing 11. The housing 11 includes an upper storage portion 12 for retainably holding a mass of solid block chemical 13. Preferably, the storage portion 12 has an upwardly disposed access port 14 through which the solid block chemical 13 is loaded into the housing 11. The metering pump 51 allows for adjustment of the flow rate of water, depending upon the desired volume and flow rate of the cleaning solution being dispensed. The access port 14 is normally covered by a door 15 mounted onto the housing 11. The door 15 is sized to completely cover and sealingly engage the access port 14. The housing 11 includes a lower collector portion, which may have a horizontal bottom wall 29, or may be configured in a funnel shape that converges downwardly to an outlet port 17.

The vertical height of the outlet port 17 is higher than the floor or other utilization point. As shown in FIG. 2, a conduit 25 extends from the outlet port 17 of the housing 11 for directing the chemical solution, by means of gravity feed, from the dispenser 10 to the floor. Optionally, a pump 18 in the detergent line 25 may be utilized to direct the solution to the utilization point.

The solid block of wash chemical 13 is housed in a sturdy container having at least one exposed surface and a removable cap or lid (not shown) which encloses the exposed surface before use. At the point of use, the cap or lid is removed, the container inverted over the access port 14 of the dispenser 10 and the chemical positioned in the dispenser 10.

The solid detergent 13 may be admixed with a wide variety of chemical compositions, depending on the particular cleaning application. The solid block 13 may contain non-compatible components which could not be effectively combined in liquid form, such as a silicon defoamer and a surfactant.

The solid block of chemical 13 is supported by a horizontal screen 19. The chemical 13 may be removed from its container and placed on the screen 19, or the chemical 13 may be retained in the container in which the chemical was cast and shipped. If the dispenser permits the block of wash chemical 13 to be "popped out," the chemical container must have an open face at least as large and preferably slightly larger than its base and must have no inner peripheral bumps, ridges, or edges which can prevent the solid block of wash chemical 13 from sliding out of the container.

In the preferred embodiment, the screen 19 is a flat, generally horizontal, continuous support screen which is mounted to the inner walls of the housing 11 at a position which defines the intersection of the support storage portion 12 and the lower collector portion 16. The support screen mesh size supports the solid block of wash chemical 13 without significantly impeding access of a water spray onto the lower face 31 of the wash chemical 13. The screen 19 preferably has openings of about 5/32 inch (0.4 cm) in size.

The dispenser 10 as disclosed herein is in a vertical configuration, in which the solid chemical 13 is positioned above the spray nozzle 21. It is to be understood that a different configuration could be utilized, for example, in which the spray nozzle 21 directs a horizontal spray onto the eroding surface 31, and the eroding surface 31 is maintained against a vertical support screen 19 by means of suitable biasing means behind the solid chemical 13.

Spray forming means are mounted in the housing 11. The spray forming nozzle 21 is connected to a pressurized source of water (or other solvent) by means of a water supply line 22. A spray control means, comprising the valve 55 in the water supply line 22, controls the flow of water to the spray nozzle 21. The valve 55 may be a control valve capable of varying the rate of water flow therethrough. The valve 55 normally blocks water flow to the nozzle 21 and it moves to its open position only upon receipt of an external control signal. Upon receipt of such a control signal, the valve 55 opens and water is allowed to flow through the supply line 22. The water is dispersed by the spray forming means 21 to impinge upon substantially the entire lower surface 31 of the chemical block 13. Spray from the nozzle 21 is of relatively low pressure (typically 10 to 25 p.s.i.) and wets only the lower portion 31 of the solid block chemical 13. The dissolved chemical passes in solution through the support screen 19, is directed by the collector portion 16 of the housing 11 to the outlet port 17, and passes through a chemical solution conduit 25 to the utilization point. If the cleaning solution is not needed for immediate use, the solution can be directed to a reservoir (not shown).

Optionally, a 1/4 to 1/20 inch (0.64–0.13 cm) lower screen (not shown) is located in the collector portion 16 of the housing 11 proximate the outlet port 17 to catch any undissolved chunks of chemical which have broken away from the main block 13 and which are small enough to pass through the support screen 19. This prevents small chunks of chemical from collecting in the outlet port 17 or in the conduit 25, thereby blocking the flow of concentrated chemical solution out of the dispenser 10.

An electrically or mechanically actuated safety control switching circuit can be connected to sense the operative position of the door 15 covering the access port 14 in order to prevent water spray from the nozzle 21 whenever the door 15 is not in its closed position overlying the access port 14, or whenever there is no solid chemical in the dispenser 10. This prevents the spray of concentrated chemical solution while the operator is loading the dispenser. A safety control switch 28 may be mounted upon the door 15.

In the preferred embodiment, the spray nozzle is mounted so as to be vertically movable with respect to the fixed solid chemical 13. Alternatively, it is within the scope of the invention to move both the nozzle position and the eroding surface to control the distance therebetween and the resulting concentration. Preferred mechanisms for adjusting the vertical position of the spray nozzle are illustrated in FIGS. 4–10.

Figure 4:
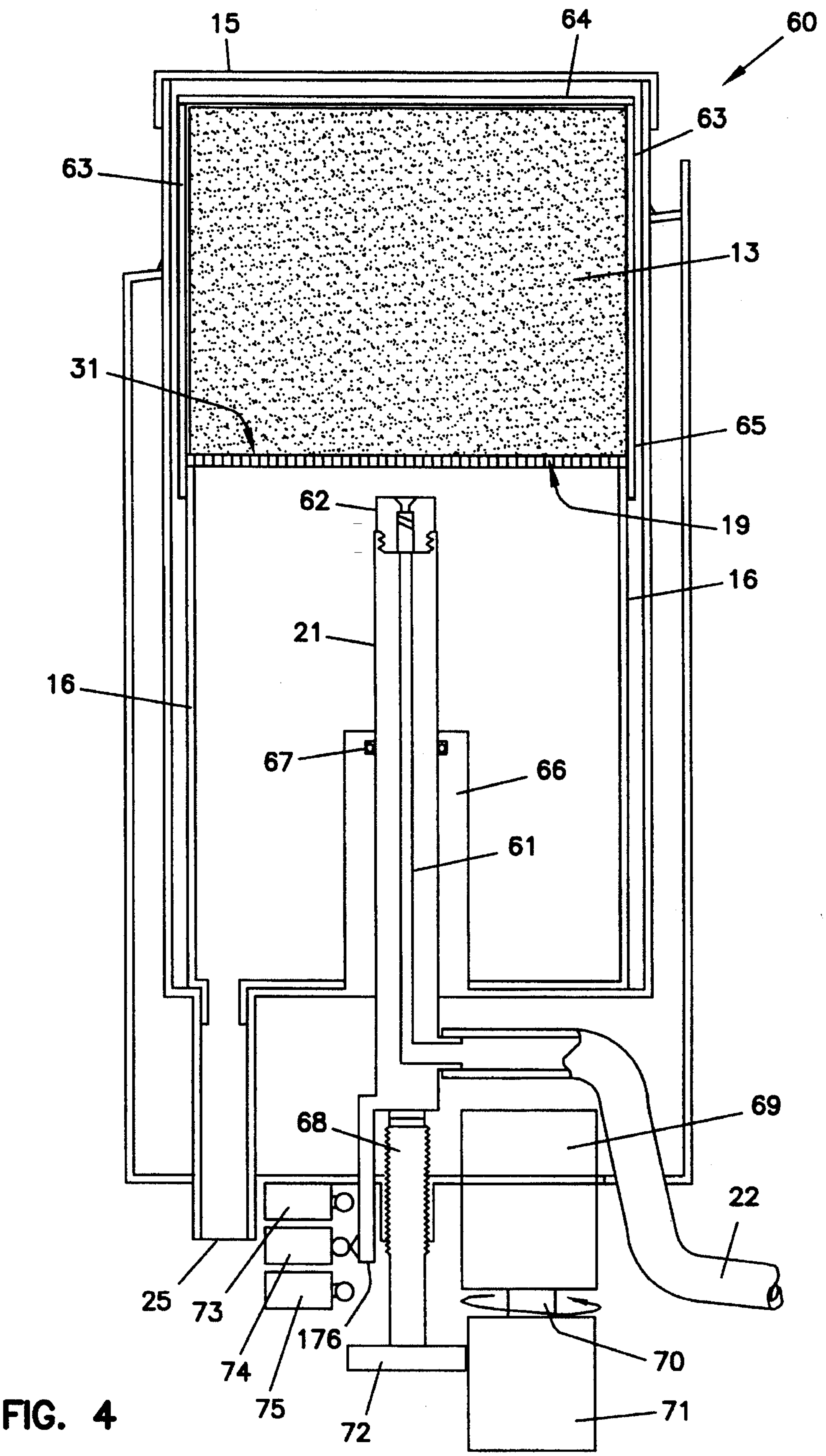
FIG. 4 is a side-elevational, schematic view of the dispenser, featuring the first embodiment of the nozzle adjustment means.

FIG. 4 illustrates a dispenser 60 having a first embodiment of the nozzle adjustment means. The dispenser 60 has a flexible inlet line 22, which is interconnected to an inlet tube 61 in the nozzle 21. The nozzle inlet tube 61 terminates in the spray head 62 of the nozzle 21. In the preferred embodiment, the spray head 62 has a spray angle of approximately ninety degrees. The solid chemical block is contained within and surrounded by a sliding capsule 63, which has a horizontal end 64 on top of the chemical and one or more side walls 65. The distance between the opposite side walls 65 is slightly larger than the distance between the housing walls of the dispenser's lower portion 16. As the chemical 13 is used up, the chemical 13 and its capsule 63 descend downwardly, and the walls of the capsule 65 slide within the walls of the dispenser's lower portion 16. In this manner, the eroding face 31 of the chemical 13 is always against the stationery screen 19 and the eroding face 31 maintains a constant position in the dispenser.

A bracket 66 supports the nozzle 21, and the bracket 66 preferably has an O-ring seal 67. At its lower end, the nozzle 21 is supported by a screw jack 68. Rotation of the screw jack 68 causes the nozzle 21 to raise and lower. The screw jack 68 is raised and lowered by a motor 69. The motor 69 is preferably a permanent magnet motor providing continuous adjustment, or a stepper motor providing adjustment in discrete increments. The motor's shaft 70 is operatively connected to a gear box 71, worm gear 72 and screw jack 68.

The position of the screw jack 68 is controlled by a plurality of position indication and control switches 73, 74, 75. In the embodiment illustrated, there are three switches vertically aligned to correspond with three concentration settings: high concentration (corresponding to switch 73), medium concentration (corresponding to switch 74) and low concentration (corresponding to switch 75). A flange 176 from the nozzle 21 extends proximate the switches 73, 74, 75. The motor 69 is operated until the desired switch 73, 74 or 75 is closed, thereby indicating that the nozzle 21 is in the desired position.

Figure 5:
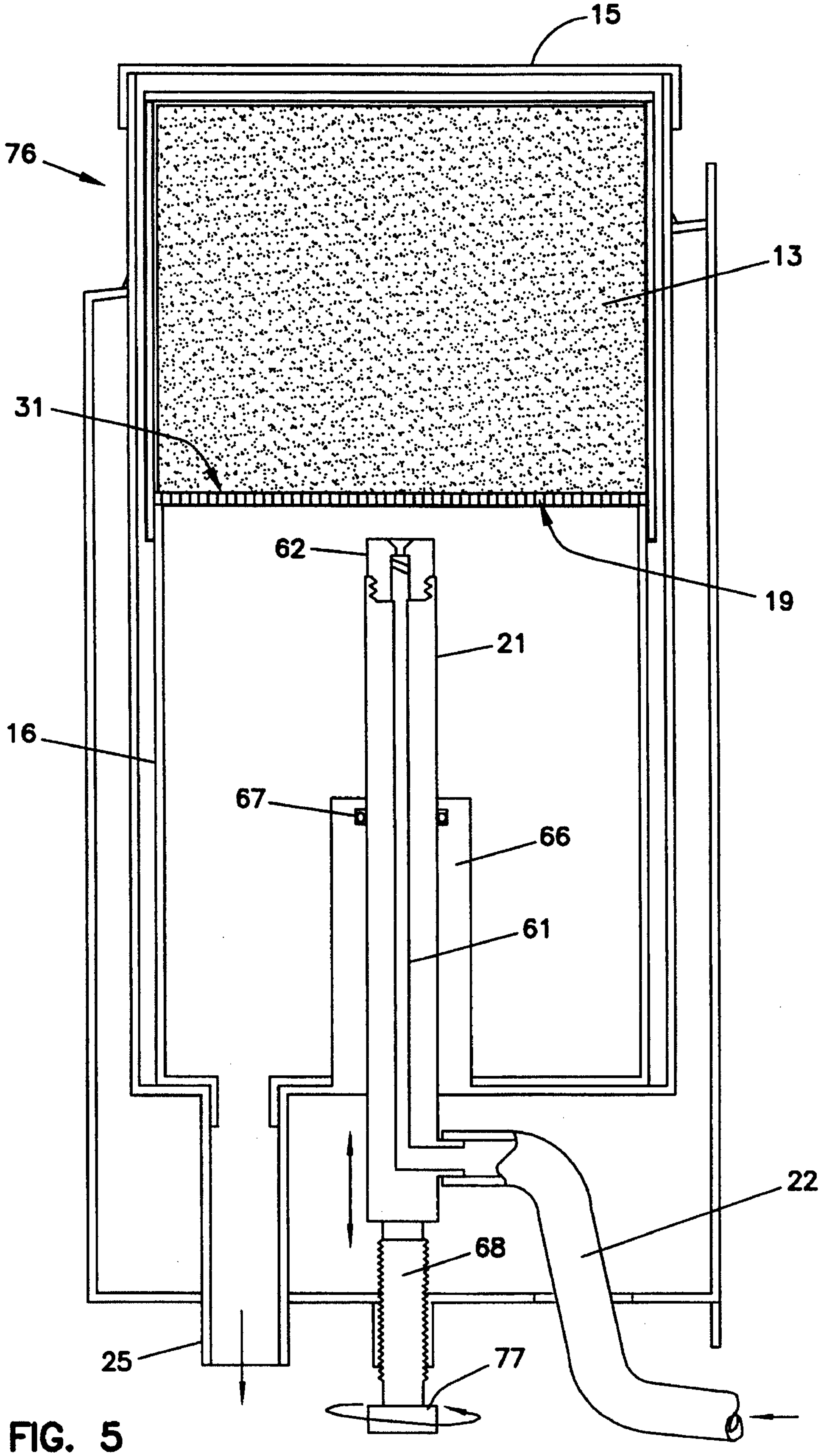
FIG. 5 is a side-elevational, schematic view of the dispenser, featuring the second embodiment of the nozzle adjustment means.

FIG. 5 illustrates a dispenser 76 having a second embodiment of the nozzle adjustment means. The dispenser 76 has a flexible inlet line 22, which is interconnected to the nozzle inlet tube 61 by suitable fastening means. The nozzle inlet tube 61 terminates in the spray head 62 of the nozzle 21. The chemical's eroding face 31 is maintained in a stationery position against the screen 19 in the manner described with respect to the first embodiment.

A bracket 66 supports the nozzle 21, and the bracket 66 preferably has an O-ring seal 67. At its lower end, the nozzle 21 is supported by a screw jack 68. Rotation of the screw jack 68 causes the nozzle to raise and lower.

The screw jack 68 is raised and lowered by a manual, rotatable knob or hand wheel 77. The knob 77 is either directly connected to the screw jack 68 (as shown in FIG. 5), or is connected to the screw jack through a series of mechanical linkages (not shown). In the preferred embodiment, the position of the nozzle 21 is continuously adjustable and there are not discrete settings as with the previous embodiment.

Figure 6:
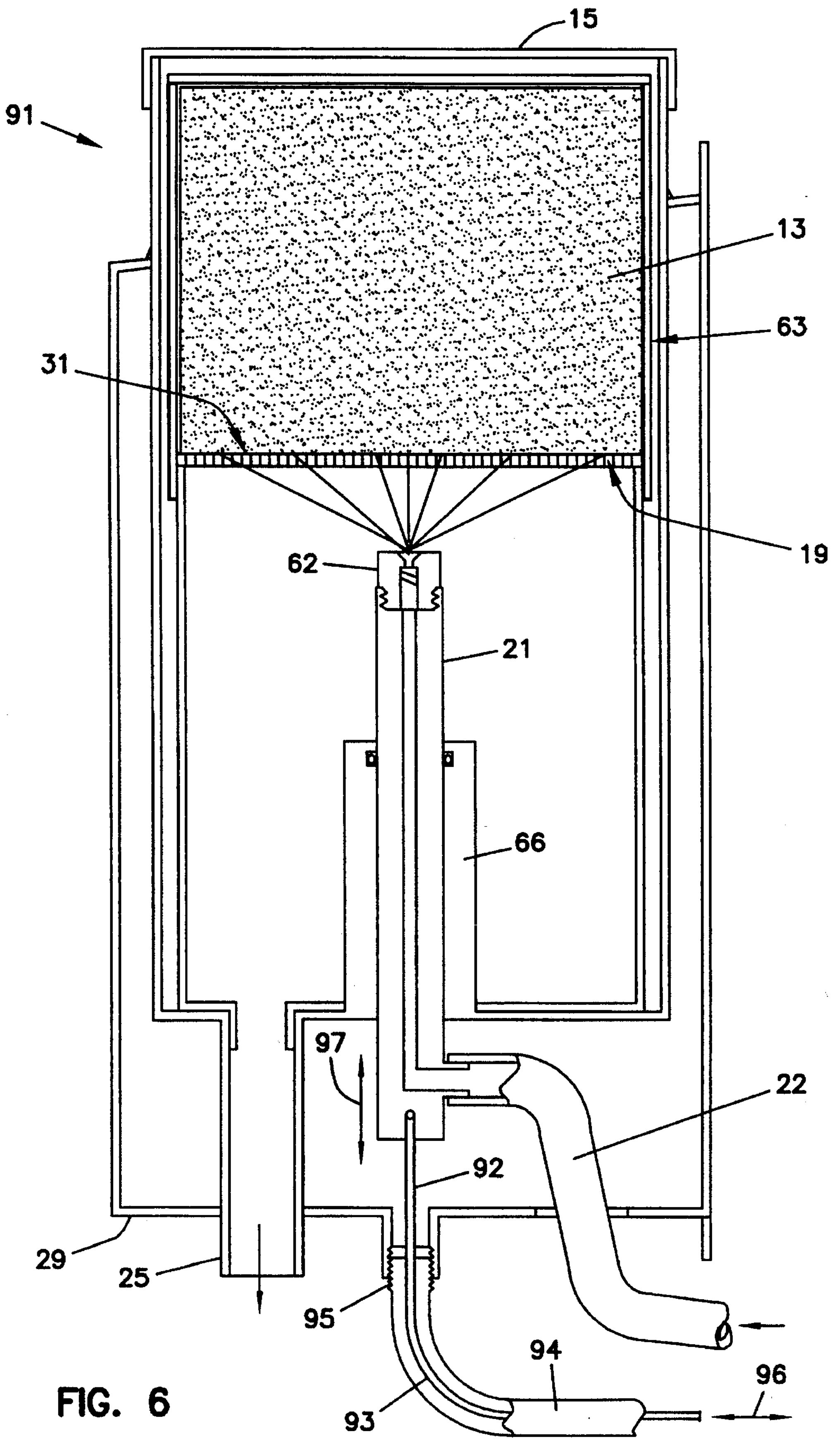
FIG. 6 is a side-elevational, schematic view of the dispenser, featuring the third embodiment of the nozzle adjustment means.

FIG. 6 illustrates a dispenser 91 having a third embodiment of the nozzle adjustment means. The dispenser 91 has a water inlet line 22, which may be either flexible or rigid. At its lower end, the nozzle 21 is interconnected to a cable end rod 92. Movement of the cable end rod 92 causes raising and lowering of the nozzle 21. The cable end rod 92 is attached to a cable 93, which is contained within a cable housing 94.

Proximate the bottom wall 29 of the dispenser 91 is a fitting 95 having screw threads which adapt to screw threads 95 on the cable housing 94. The screw threads 95 allow the position of the cable housing 94 to be adjusted somewhat. Movement of the nozzle 21 is accomplished by movement of the cable 93, as shown by the arrows 96, 97. That is, movement of the cable 93 to the right lowers the nozzle 21.

The cable 93 is interconnected to the floor scrubber's control panel 50, as shown by line 57 of FIG. 2. On the control panel 50 has a knob (not shown) which is preferably connected to sector and pinion gears (not shown). In this manner, the rotary motion of the knob is converted to linear push-pull motion of the cable 93. Optionally, a click spring can be added to provide a "click" and additional friction for certain predetermined degrees of rotation which correspond to different concentration settings.

Figure 7:
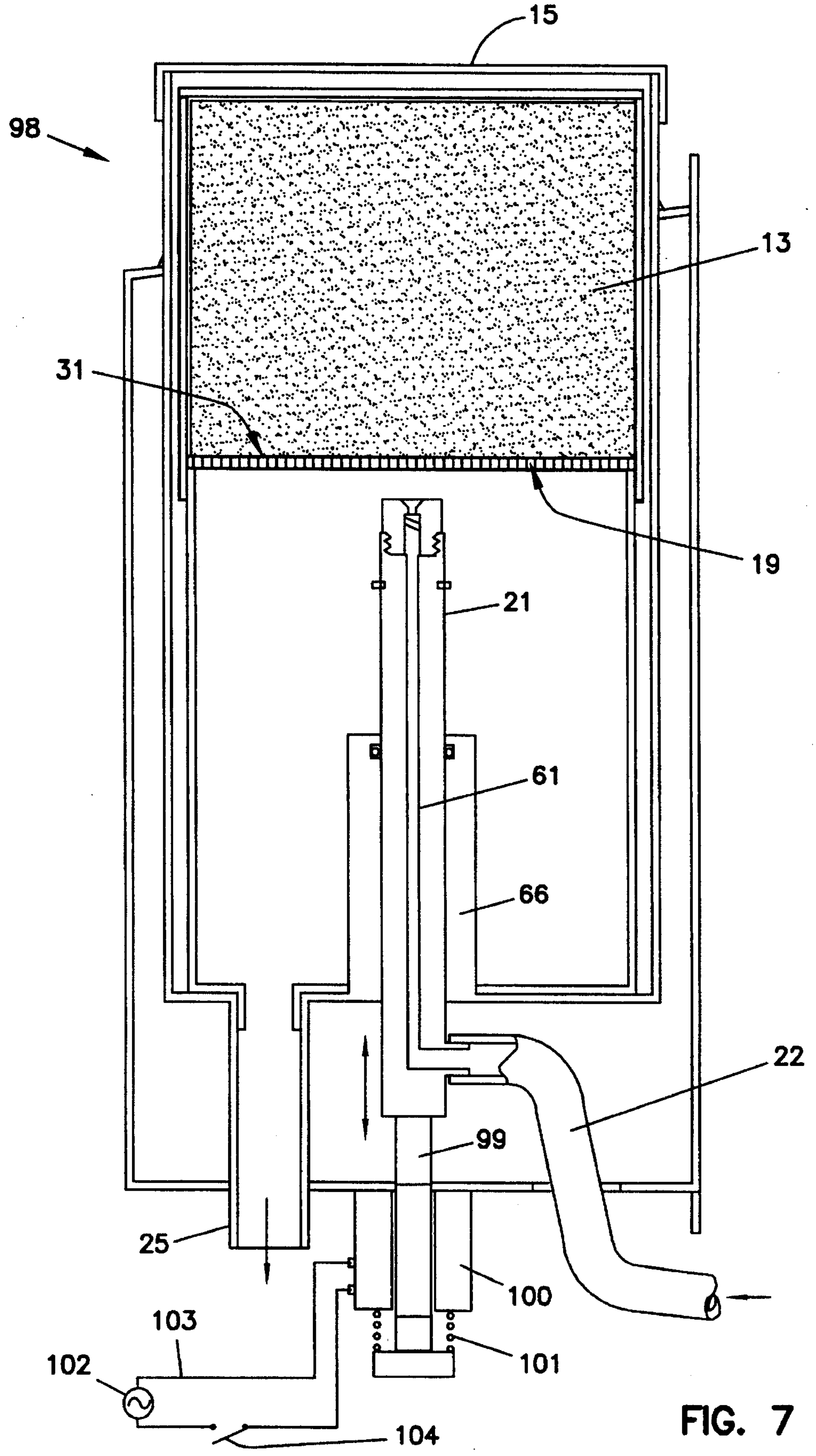
FIG. 7 is a side-elevational, schematic view of the dispenser, featuring the fourth embodiment of the nozzle adjustment means.

FIG. 7 illustrates a dispenser 98 having a fourth embodiment of the nozzle adjustment means. The dispenser 98 has a water inlet line 22, which is preferably flexible. The lower end of the nozzle 21 is attached to a rod 99, the position of which is controlled by a solenoid 100. In the embodiment, the nozzle has two vertical positions: an upper position corresponding to the energized position of the solenoid 100, and a lower position corresponding to the de-energized position of the solenoid 100. The solenoid 100 is shown in its energized position in FIG. 7. A spring 101 biases the rod in its "down" position when the solenoid is not energized.

The solenoid 100 is electrically interconnected by circuitry 103 to a power source 102, which may be a wall plug, battery, or other suitable wall source. Closure of the switch 104 causes energization of the solenoid 100, thereby raising the rod and nozzle 21 and moving the dispenser to its "high concentration" position. When the solenoid is de-energized, the nozzle moves downwardly to its "low concentration" position.

Figure 8A:
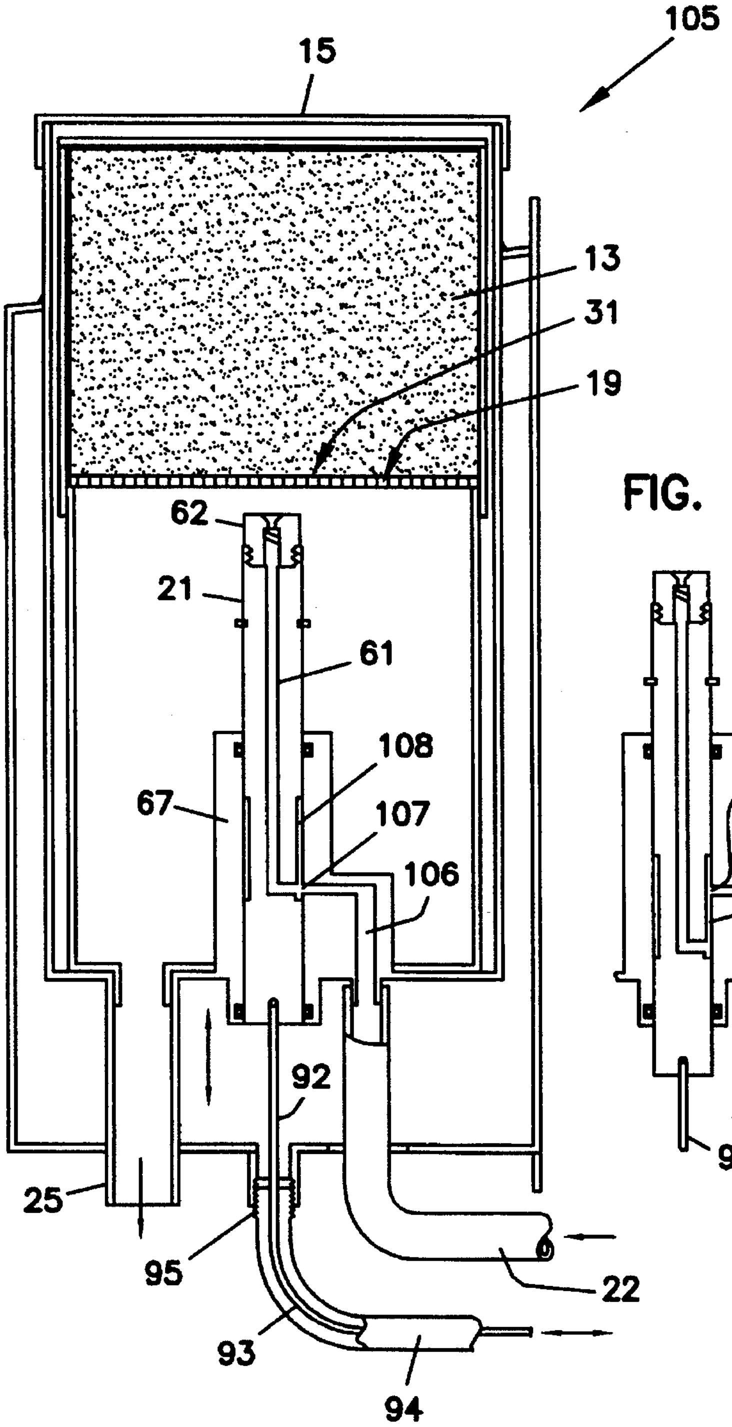
FIGS. 8A, 8B and 8C are side-elevational, schematic views of the dispenser, featuring the fifth embodiment of the nozzle adjustment means.
Figure 8B:
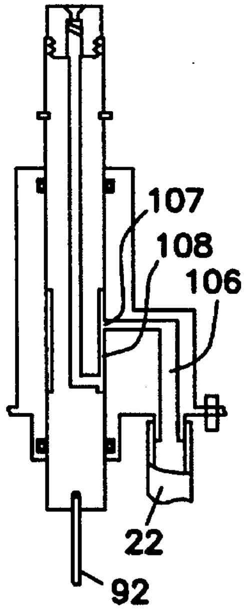
Figure 8C:
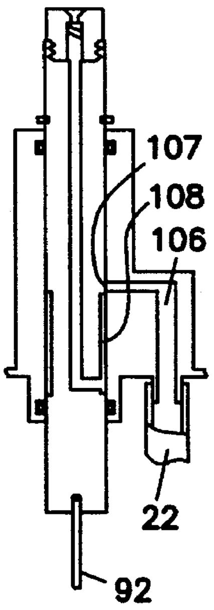

FIGS. 8A, 8B and 8C illustrate a dispenser 105 having a fifth embodiment of the nozzle adjustment means. FIG. 8A illustrates the nozzle 21 in its high position; FIG. 8B illustrates the nozzle 21 in its medium position; and FIG. 8C illustrates the nozzle 21 in its low position, wherein a shut-off feature is activated.

With this embodiment, the water inlet line 22 is preferably rigid. It is in fluid communication with an intermediate water line 106, which has an outlet port 107. At the end opposite the spray head 62, the nozzle's water tube 61 terminates in a longitudinal annular channel 108. Vertical movement of the nozzle 21 is controlled by a cable arrangement, similar to that illustrated in FIG. 6.

As shown in FIG. 8A, the water flows through line 22, then through intermediate line 106. The outlet port 107 is in fluid communication with the lower portion of the annular channel 108, such that water flows up the nozzle 21 and out the spray head 62. Similarly, the water flows through conduits 22, 106 and 61 when the nozzle is in the position shown in FIG. 8B. In FIG. 8C, in which the nozzle 21 is in its lowest position, water flow is blocked. This is because the outlet port 106 is not in fluid communication with the annular channel 108.

Figure 9:
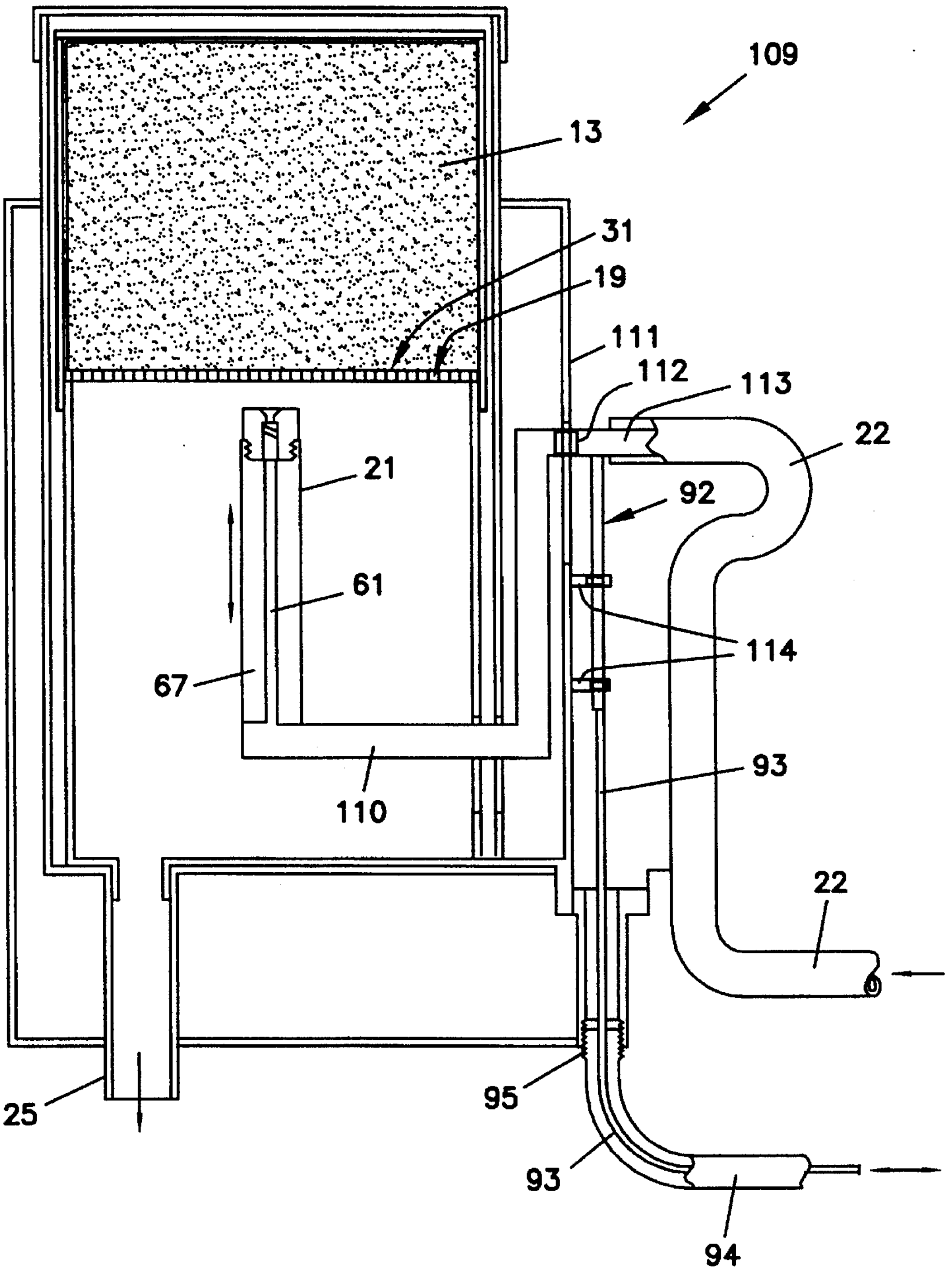
FIG. 9 is a side-elevational, schematic view of the dispenser, featuring the sixth embodiment of the nozzle adjustment means.

FIG. 9 illustrates a dispenser 109 having a sixth embodiment of the nozzle adjustment means. In this embodiment, the lower portion of the nozzle is in fluid communication with a U-tube 110. The U-tube 110 acts as a cantilever support for the nozzle 21. The distal end 113 of the rigid U-tube is operatively connected to the flexible water inlet hose 22. The U-tube 110 extends through a guide 111 having a linear bearing 112. The vertical position of the U-tube 110 controls the vertical position of the nozzle 21. A cable assembly, similar to that described in connection with FIG. 6, adjusts the vertical position of the U-tube 110. A plurality of brackets 114 extend from the guide 111 to provide stability to the cable end rod 92.

Figure 10:
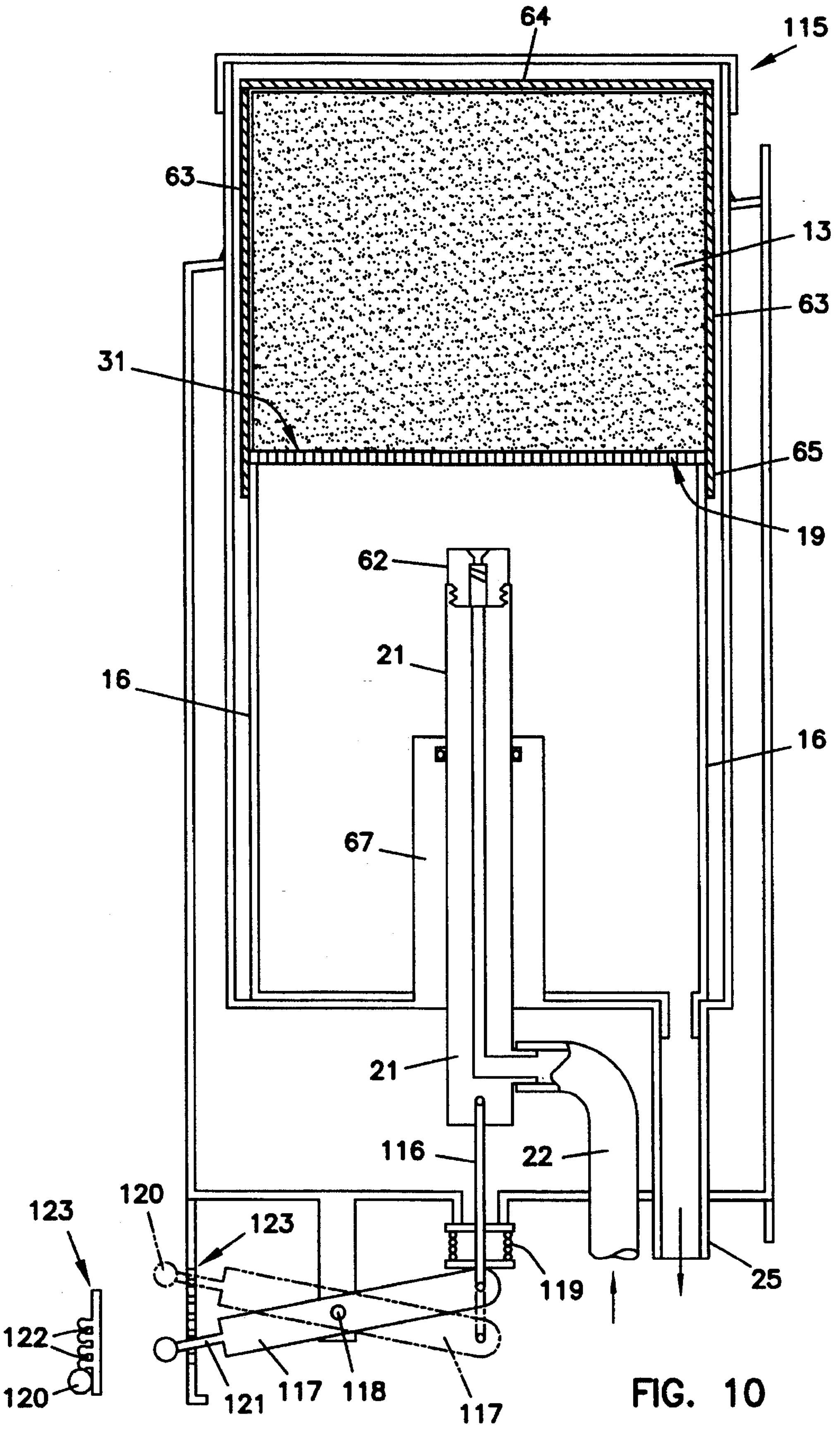
FIG. 10 is a side-elevational, schematic view of the dispenser, featuring the seventh embodiment of the nozzle adjustment means.

FIG. 10 illustrates a dispenser 115 having a seventh embodiment of the nozzle adjustment means. Attached to the lower end of the nozzle 21 is a vertical push rod 116. The lower end of the push rod 116 is attached to a lever 117, which is pivotable about its center point 118. The heavy lines illustrate the position of the lever 117, push rod 116, and nozzle 21 in their high position. The dashed lines illustrate the position of the lever 117, push rod 116, and nozzle 21 in their low position. A spring 119 biases the push rod 116 to the lowest position, if the lever 117 is released.

The position of the lever 117 is adjusted by movement of a knob 120, attached to the end of a lever rod 121. A position lock 123 is provided proximate the control panel 50. The lever rod 121 can be moved into one of a plurality of apertures 122 on the position lock 123, thereby adjusting the position of the nozzle 21. The embodiment illustrated in FIG. 10 illustrates a position lock 123 with five positions. However, a different number of positions, or a lever control allowing for continuous adjustment, could be provided.

The distance between the nozzle 21 and the eroding surface 30 affects the area of the eroding surface which is directly impinged from the water sprayed by the nozzle 21. As shown in FIG. 3, only a central portion of the eroding surface 31 may be directly impinged by the water when the product 13 is in its low position. As the nozzle 21 is lowered, a larger amount of eroding surface 31 is impinged, until the entire eroding surface 31 is impinged for "full cone coverage." If the nozzle-to-eroding surface distance is increased beyond that point, then an outer portion of the water spray will impinge the inner walls of the housing 12 before reaching the solid chemical 13.

The concentration can be effectively controlled and adjusted even when the spray nozzle 21 is above or below the point at which full cone coverage is achieved. However, the screen 19, water pressure, and distance between the nozzle 21 and the eroding surface 31 should be such that the lower surface 31 of the chemical 13 is substantially flat and not convex. It has been found that the channeling of water around the screen 19 tends to allow for a relatively uniform rate of dissolution and a relatively flat configuration of the chemical block's lower surface 31.

The optimum distance between the nozzle 21 and the eroding surface 31 will depend upon the diameter of the solid chemical 13. The solid chemical 13 may be cast in various sizes and configurations, although the preferred solid chemical 13 is a cylindrical mass having a diameter of approximately 3 inches (7.6 cm). Furthermore, a variety of nozzle configurations can be utilized, although the preferred embodiment uses a nozzle with a 90° spray angle. Assuming a nozzle having a spray angle in the range of 60°– 120°, and assuming that R is the radius of the solid product 13, the preferred nozzle-to-eroding surface distance is approximately ½ R to 2 R. That is, for a three inch diameter solid chemical, the preferred distance would be approximately 0.75 inches to 3 inches. For a nozzle having a different spray angle, the above range would be somewhat different depending upon the geometry of the situation.

As used herein, the words "diameter", "radius" and the letter "R" are not meant to imply that the solid product 13 must be circular in cross-section. Rather, the chemical 13 could have a different cross-sectional shape, such as square, octagonal, etc.

Although the present invention is described in conjunction with a solid block concentrate 13 and a flat screen 19, it is to be understood that the dispenser could contain a powdered concentrate supported by a relatively fine screen. The screen may be either horizontal or convex.

In operation, a container 20 containing a block of solid chemical 13 is loaded into the housing 11 through the access port 14. The container cap (not shown) is removed, the container 20 is inverted, and the open face or exposed surface 31 of the solid wash chemical 13 is placed upon the support screen 19. The cross-sectional area of the wash chemical block 13 should be about the same size as the cross-sectional area of the housing 11 to allow the block 13 to rest flatly upon the support screen 19 and to prevent water spray from passing along dispenser housing's inner wall or onto the door 15.

The solvent is added to the reservoir 83, and the solvent is preferably water. Alternatively, the solvent could be a chemically-modified solution. That is, the solvent could be a solution which is reactive with the solid block 13. For example, liquid hydrogen peroxide could be added to water to form the solvent, and the solid block could contain acetic acid. The resulting chemical solution would contain peracetic acid, which is an effective sanitizer and bleach.

The water follows a fluid flow path from the water source through water supply lines 50 and 25 to spray-forming nozzle 21 whenever the valve 55 is opened, either electronically or manually. When provided with fluid flow therethrough, spray-forming nozzle 21 will direct a spray pattern at the bottom surface 31 of the solid chemical 13, wetting the lower portion of the chemical 13, which dissolves and passes in solution through support screen 19 to the collector portion 16 of the housing 11. The concentrate detergent solution passes through the outlet port 17 of housing member 11 and is directed by conduit 25 to a reservoir or utilization point.

The concentration of the detergent solution is controlled either manually by the user or automatically by means of suitable sensing means, such as a conductivity sensor. In the preferred embodiment, the lowering of the spray nozzle with respect to the fixed solid chemical results in a decreased concentration of the detergent solution. Alternatively, increasing the concentration of the detergent solution may be accomplished by raising the spray nozzle's position. This raising and lowering of the spray nozzle is accomplished by the adjustment means illustrated in FIGS. 4–10, or by equivalents thereof.

Disclosed below in Example I is the procedure utilized to generate the data for the dissolving characteristics of the dispenser 10. Based upon such data concerning the effect of the nozzle-to-eroding surface distance, a regression model can be developed. This regression model is utilized to predict the resulting chemical concentration when a certain spray nozzle-to-eroding surface distance is set. Other variables such as the voltage of the pump 51 and the water temperature will affect the solution concentration. That is, increased water pressure and increased temperature result in a larger amount of solid chemical 13 being dissolved and a higher concentration of the solution. However, the nozzle-to-eroding surface distance is a more important determinant of solution concentration than pump voltage, water temperature and water pressure.

EXAMPLE I

A cylindrical container having an diameter of about 3.5 inches (8.9 cm) and a height of about 3 inches (7.6 cm) were filled with one pound (0.45 kg) of a floor cleaner detergent. The container 20 was allowed to cool to room temperature before dispensing.

The container 20 was placed in a dispenser similar to the dispenser 10 of this invention, with the chemical 13 being supported upon a flat horizontal screen 19. The screen 19 was a metal plate with 5⁄32 inch (0.4 cm) round holes spaced approximately 5 to the inch (approximately 2 to the cm). The nozzle had a 90° spray angle and was manufactured by Spraying Systems Inc. The position of the screen carriage was moved vertically, thereby moving the exposed chemical surface, so that the distance between the spray nozzle 21 and the exposed erosion surface 30 of the detergent ranged from about one inch (2.5 cm) to about two inches (5.1 cm).

In separate tests, the water was maintained at a temperature of about 50° F. and 80° F. and was sprayed at a pressure of about 10 psi and 30 psi onto the exposed erosion surface of the detergent to produce a 5 liter sample. The amount of detergent dispensed was measured by weighing the container immediately before and after the spray. The results of the experiment are tabulated in Table 1. As is clearly shown, the concentration of the detergent solution dispensed increased as the distance between the spray nozzle 21 and the erosion surface 30 decreased. A 1.5 inch (3.8 cm) difference in distance between the spray nozzle and the eroding surface caused approximately a two to three times effect on the detergent concentration.

TABLE I (10 psi; 50° F.)

| Nozzle to Surface Distance (Inches) | PPM Dissolved |
|---|---|
| 1.0 | 697 |
| 1.5 | 581 |
| 2.0 | 332 |

TABLE II (30 psi; 50° F.)

| Nozzle to Surface Distance (Inches) | PPM Dissolved |
|---|---|
| 1.0 | 663 |
| 1.5 | 646 |
| 2.0 | 210 |

TABLE III (10 psi; 80° F.)

| Nozzle to Surface Distance (Inches) | PPM Dissolved |
|---|---|
| 1.0 | 1016 |
| 1.5 | 765 |
| 2.0 | 333 |

TABLE IV (30 psi; 80° F.)

| Nozzle to Surface Distance (Inches) | PPM Dissolved |
|---|---|
| 1.0 | 1549 |
| 1.5 | 1200 |
| 2.0 | 557 |

Other modifications of the invention will be apparent to those skilled in the art in light of the foregoing description. For example, two dispensers 10 could be utilized for dispensing two different types of solid products 13 which are incompatible with each other. Proximate the utilization point, the two solutions could be combined.

This description is intended to provide concrete examples of individual embodiments clearly disclosed in the present invention. Accordingly, the invention is not limited to these embodiments or to the use of specific elements therein. All alternative modifications and variations of the present invention which fall within the spirit and broad scope of the appended claims are covered.

What is claimed is:

1. A dispenser for a solid chemical, comprising:

(a) a spray nozzle for directing a solvent upon an eroding surface of a solid chemical, said chemical being located within a housing, wherein the chemical immediately adjacent said spray nozzle is dissolved and passes out of said dispenser in solution form, wherein said solid chemical is supported upon a screen above said spray nozzle;

(b) adjustment means for varying a distance between said spray nozzle and said screen, said distance being variable between a first, high concentration setting and a second, low concentration setting, said eroding surface having a fixed position and said spray nozzle being vertically movable between a first position and a second position, wherein a concentration of the chemical in the solution is adjustable between said high concentration setting and said low concentration setting; and (c) indication means operatively connected to said adjustment means for displaying the spray nozzle positions which correspond to said high concentration setting and said low concentration setting.

2. The dispenser according to claim 1, wherein said adjustment means further comprises means for moving said eroding surface of said solid chemical.

3. The dispenser according to claim 1, wherein a radius of the solid chemical is R, said nozzle has a spray angle of approximately 90 degrees, and the distance between said spray nozzle and said eroding surface is adjustable from approximately ½ R to 2 R.

4. The dispenser according to claim 3, wherein said screen has openings of approximately 0.4 cm.

5. The dispenser according to claim 1, wherein said solvent is water.

6. The dispenser according to claim 1, wherein said solvent contains a chemical additive which is reactive with the solid chemical.

7. The dispenser according to claim 1, wherein the solid chemical contains at least two components which are non-compatible in liquid form.

8. The dispenser according to claim 1, wherein said adjustment means has a plurality of discrete concentration settings.

9. The dispenser according to claim 1, further comprising a capsule for containing the solid chemical, said capsule having at least one side wall, said capsule side wall being slidably engageable with a housing wall in a lower portion of said dispenser.

10. The dispenser according to claim 1, wherein said adjustment means comprises a threaded support means for said spray nozzle.

11. The dispenser according to claim 10, wherein said threaded support means is powered by a motor.

12. The dispenser according to claim 10, wherein said threaded support means is controlled by a manual knob.

13. The dispenser according to claim 1, wherein said adjustment means comprises a cable means for supporting said spray nozzle.

14. The dispenser according to claim 1, wherein said spray nozzle is mounted upon a support member and said adjustment means comprises a cable means.

15. The dispenser according to claim 14, wherein said support means comprises a water inlet conduit.

16. The dispenser according to claim 15, further comprising a solvent blocking means for blocking solvent flow when said spray nozzle is in a predetermined position.

17. The dispenser according to claim 1, wherein said adjustment means comprises a support rod for said spray nozzle, the position of said support knob being controlled by a solenoid.

18. The dispenser according to claim 1, wherein said adjustment means comprises a push rod supporting said spray nozzle, the position of said push rod being movable by a lever means.

19. The method for dispensing a solid chemical having an eroding surface, comprising the steps of:

(a) providing the apparatus of claim 1;

(b) directing a solvent through a inlet line, said inlet line being in fluid communication with a movable spray nozzle, wherein the chemical proximate the spray nozzle is dissolved and passes in a solution;

(c) adjusting a distance between said spray nozzle and said screen between a first, high concentration setting and a second, low concentration setting by adjusting a vertical position of said spray nozzle, wherein the concentration of chemical dispensed is adjusted between a high concentration and a low concentration; and (d) impinging the solvent from said spray nozzle upon said eroding surface of said solid chemical.

20. The method according to claim 19, further comprising the step of placing said solid chemical upon a screen.

21. The method according to claim 19, wherein said distance adjustment step is in response to concentration sensing means.

22. The method according to claim 21, wherein said concentration sensing means includes a conductivity sensor.

23. The method according to claim 19, further comprising the step of adjusting a flow rate of the solvent.

24. The method according to claim 19, wherein said spray nozzle is moved vertically by screw thread means.

25. The method according to claim 19, wherein said spray nozzle is moved vertically by solenoid means.

26. The method according to claim 19, wherein said spray nozzle is moved vertically by cable means.

27. The method according to claim 19, wherein said spray nozzle is moved vertically by lever means.

28. The method according to claim 19, further comprising the step of forming the solvent from water and a chemical additive which is reactive with the solid chemical.

* * * * *